(12) United States Patent
Erickson et al.

(10) Patent No.: US 9,219,948 B2
(45) Date of Patent: Dec. 22, 2015

(54) METHOD AND SYSTEM FOR COMPRESSION AND DECOMPRESSION FOR HANDLING WEB CONTENT

(75) Inventors: David Erickson, San Clemente, CA (US); Marcus Kellerman, San Diego, CA (US); Xuemin Chen, Rancho Santa Fe, CA (US); Vladimir Silyaev, Laguna Niguel, CA (US)

(73) Assignee: BROADCOM CORPORATION, Irvine, CA (US)

( * ) Notice: Subject to any disclaimer, the term of this patent is extended or adjusted under 35 U.S.C. 154(b) by 725 days.

(21) Appl. No.: 12/650,067

(22) Filed: Dec. 30, 2009

(65) Prior Publication Data
US 2011/0161523 A1   Jun. 30, 2011

(51) Int. Cl.
*G06F 15/16*   (2006.01)
*H04N 21/4782*   (2011.01)
*H04N 19/40*   (2014.01)

(52) U.S. Cl.
CPC ........... *H04N 21/4782* (2013.01); *H04N 19/40* (2014.11)

(58) Field of Classification Search
CPC .................................................... H04N 19/40
USPC ...................................... 709/247, 219; 725/93
See application file for complete search history.

(56) References Cited

U.S. PATENT DOCUMENTS

| 6,462,748 | B1 * | 10/2002 | Fushiki et al. | 345/604 |
| 7,055,169 | B2 * | 5/2006 | Delpuch et al. | 725/100 |
| 2003/0016864 | A1 * | 1/2003 | McGee et al. | 382/165 |
| 2008/0282299 | A1 * | 11/2008 | Koat et al. | 725/93 |
| 2009/0293088 | A1 * | 11/2009 | Mukerji et al. | 725/47 |
| 2010/0158099 | A1 * | 6/2010 | Kalva et al. | 375/240.01 |

* cited by examiner

*Primary Examiner* — Glenford Madamba
(74) *Attorney, Agent, or Firm* — Foley & Lardner LLP; Christopher J. McKenna; Paul M. H. Pua

(57) ABSTRACT

Certain aspects of a method and system for compression and decompression for handling web content may include a communication system that comprises a server in a server computing cloud that coordinates operation of one or more set-top boxes. The server may be operable to receive a request to display one or more frames of web content from the one or more set-top boxes. The server may be operable to receive one or more parameters associated with the one or more frames of the requested web content from the one or more set-top boxes. The server may be operable to dynamically encode at least a portion of one or more frames of the requested web content into one or more color spaces based on the received one or more parameters.

21 Claims, 7 Drawing Sheets

METHOD AND SYSTEM FOR COMPRESSION AND DECOMPRESSION FOR HANDLING WEB CONTENT

CROSS-REFERENCE TO RELATED APPLICATIONS/INCORPORATION BY REFERENCE

This patent application makes reference to, claims priority to and claims benefit from U.S. Provisional Patent Application Ser. No. 61/261,780 filed on Nov. 17, 2009. This application also makes reference to:

U.S. patent application Ser. No. 12/650,145 filed on Dec. 30, 2009
U.S. patent application Ser. No. 12/650,141 which was filed on Dec. 30, 2009
U.S. patent application Ser. No. 12/650,140 which was filed on Dec. 30, 2009
U.S. patent application Ser. No. 12/649,971 which was filed on Dec. 30, 2009
U.S. patent application Ser. No. 12/650,069 which was filed on Dec. 30, 2009
U.S. patent application Ser. No. 12/650,020 which was filed on Dec. 30, 2009
U.S. patent application Ser. No. 12/650,171 which was filed on Dec. 30, 2009; and
U.S. patent application Ser. No. 12/649,998 which was filed on Dec. 30, 2009.

Each of the above stated applications is hereby incorporated herein by reference in its entirety.

FIELD OF THE INVENTION

Certain embodiments of the invention relate to digital video processing. More specifically, certain embodiments of the invention relate to a method and system for compression and decompression for handling web content.

BACKGROUND OF THE INVENTION

With the continuous growth of on-line businesses, social networks, and other on-line services and applications, a user may want a larger number of places or locations from which to access the Internet in a manner that is flexible and/or suits the user's lifestyle. Most users currently connect to the Internet using a web browser running on a personal computer. While only a portion of homes have a computer, most homes have a television, and in many instances, multiple televisions. Therefore, rather than using a computer to access the Internet, a user may find it more convenient to use the flat screen televisions and/or monitors in homes for the same purpose. To do so, a set-top-box (STB) connected to, for example, a flat screen television may be provided with web browsing software and protocols, and Internet connectivity, which may enable the user to easily access the Internet or check their electronic mail (email), for example, from a convenient and comfortable location such as their living room.

A major revolution in video display technology includes flat screens based on either liquid crystal display (LCD) or plasma display panel (PDP) technology that are rapidly replacing the cathode ray tube (CRT) technology that served as the primary display device for more than a half a century. A significant consequence of the new video display technologies is that pictures may now be displayed at higher picture-rates with progressive scanning on a flat screen. The new video display technologies may also facilitate a faster transition from standard definition television (SDTV) to high-definition television (HDTV). However, legacy video compression systems still use formats with lower picture-rates and may be unable to optimally display legacy video on modern display screens.

There may be restrictions on channel capacity that may affect the display of low picture-rate pictures. For example, considering a 30 Hz video sequence that may be broadcast over a mobile network, the terminals, for example, mobile phones may receive an encoded video sequence from a server. However, due to bandwidth limitations, only a low bit-rate video sequence may be communicated. As a result, the encoder may remove two out of every three pictures to be transmitted, resulting in a sequence with a picture rate of about 10 Hz, for example. The terminal may be capable of displaying video at 30 Hz but since it receives a 10 Hz video, it may have to perform some form of picture-rate conversion.

Most video compression is lossy because it operates on the premise that much of the data present before compression may not be necessary for achieving good perceptual quality. For example, a video coding standard called MPEG-2 may be enabled to compress around two hours of video data by 15 to 30 times, while still producing a picture quality that may be generally considered high-quality for standard-definition video. Video compression is a tradeoff between storage space, video quality, and the cost of hardware required to decompress the video in a reasonable time. However, if the video is overcompressed in a lossy manner, visible and sometimes distracting artifacts may appear.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for compression and decompression for handling web content, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
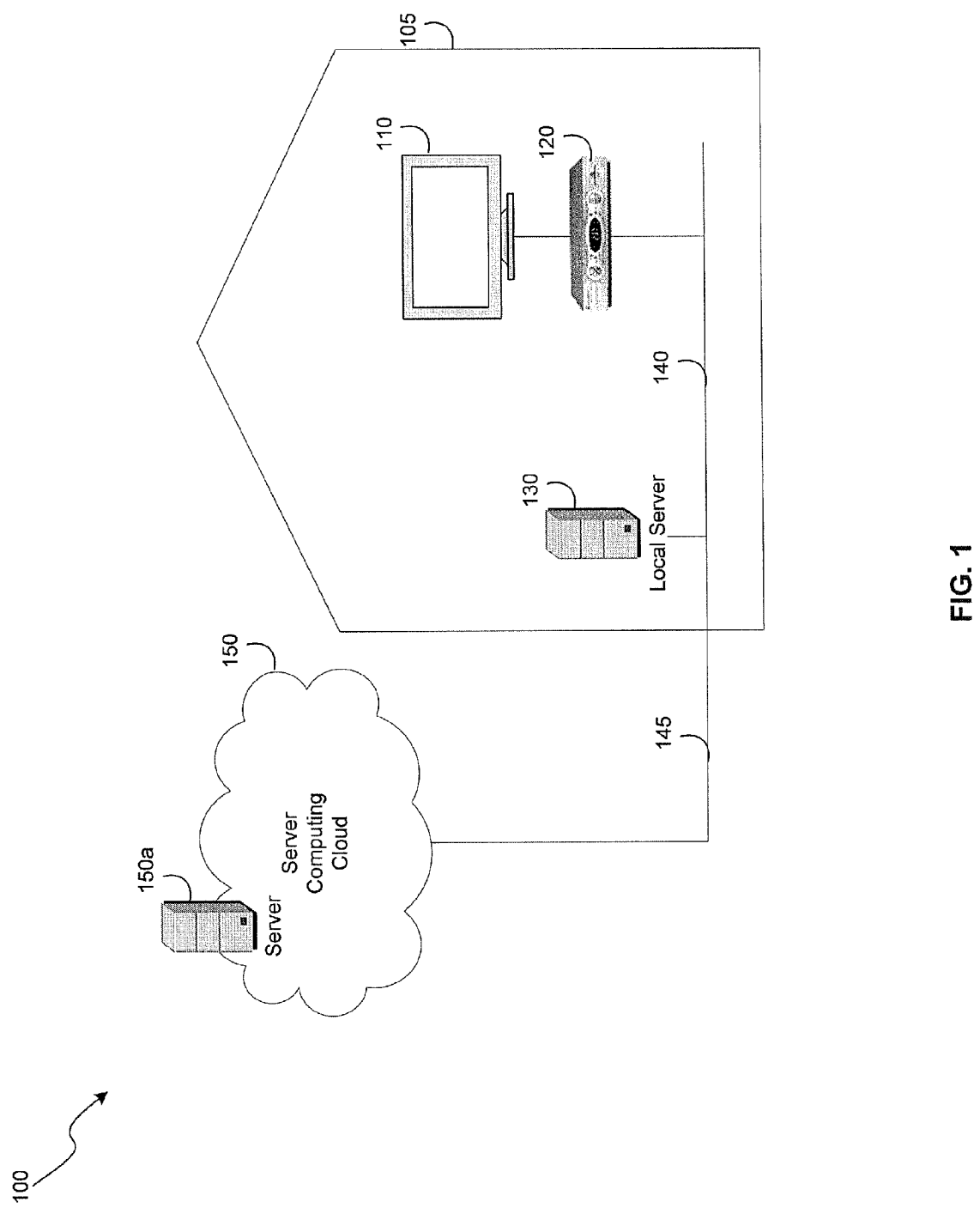
FIG. 1 is a diagram that illustrates an exemplary home or office configured to access Internet services via a set-top-box (STB), in accordance with an embodiment of the invention.

Certain embodiments of the invention may be found in a system and/or method for compression and decompression for handling web content. Various aspects of the invention may comprise a communication system that comprises a server in a server computing cloud, which coordinates operation of one or more set-top boxes. The server may be operable to receive a request to display one or more frames of web content from the one or more set-top boxes. The server may be operable to receive one or more parameters associated with the one or more frames of the requested web content from the one or more set-top boxes. The server may be operable to dynamically encode at least a portion of one or more frames of the requested web content into one or more color spaces based on the received one or more parameters.

FIG. 1A is a diagram that illustrates an exemplary home or office configured to access Internet services via a set-top-box (STB), in accordance with an embodiment of the invention. Referring to FIG. 1A, there is shown a communication system 100. The communication system 100 may comprise a location 105 within which may be disposed a television 110, one or more STBs 120, a local server 130, and a broadband connection 140. Also shown in FIG. 1A is a computing cloud 150 coupled to the location 105 via a broadband connection 145. Notwithstanding, the invention may not be so limited, and a plurality of set-top boxes may be utilized without limiting the scope of the invention.

The location 105 may be a home, a business, a school, a library, and/or other like setting in which a user may want to access the Internet and/or check their electronic mail (email). The position or placement of the television set 110, one or more STBs 120, and/or the local server 130 within the location 105 may be based on user convenience and/or lifestyle. For example, when location 105 is a home (for example, a house, an apartment), the television 110 and the STB 120 may be located in a bedroom, a family room, or an entertainment room. In another example, when location 105 is a business or a public building, the television 110 and the STB 120 may be located in a conference room. The local server 130 may be located nearby (for example, in the same room) the television set 110 and the STB 120 or may be located remotely (for example, in another room or nearby building) from the television set 110 and the STB 120. In some embodiments of the invention, the broadband connection 140 may provide a wired connection that communicatively couples two or more devices within the location 105 utilizing a coaxial cable, for example. In other embodiments of the invention, in addition to wired connectivity, a portion of the broadband connection 140 may provide a wireless connection between two or more devices within the location 105.

The television 110 may comprise suitable logic, circuitry, code, and/or interfaces that may be operable to receive signals from which to display images (for example, moving images) that are typically accompanied by sound. The television 100 may be based on, for example, cathode ray tube (CRT) technology, plasma technology, liquid crystal display (LCD) technology, and/or light emitting diode (LED) backlit LCD technology. The television 110 may be operable to support one or multiple technical standards such as digital television (DTV) and high-definition television (HDTV), for example. The resolution of the screen or display portion of the television 110 may be based on the technical standard supported by the television 110. For example, for HDTV, the resolution of the screen may be 720$p$, 1080$i$, or 1080$p$, where the numeral indicates the vertical resolution of the screen, the letter "p" refers to progressive-scan format, and the letter "i" refers to interlaced-scan format.

The STB 120 may comprise suitable logic, circuitry, code, and/or interfaces that may be operable to connect the television 110 to an external source of signals and to convert those signals into content that may be displayed on the screen of the television 110. The STB may be operable to provide processing associated with decoding, managing, delivering, and/or storing video content that may be displayed on the television 110.

The STB 120 may also be operable to run a web browser that may be displayed on the screen of the television 110 for user interaction. A web browser is typically a software application that may enable a user to retrieve, present, or review information resources available on, for example, the World Wide Web ("the Web"). An information resource may comprise a web page, an image, video, text, audio, graphics, and/or other type of multimedia content, for example. A web browser may also be utilized to access information that is provided by web servers in private networks and/or files in file systems. Examples of web browsers may comprise Internet Explorer, Mozilla Firefox, Apple Safari, Google Chrome, Opera, and/or browsers that may be native or custom-made for the STB 120.

Information resources are brought to the user via the web browser when the user inputs a Uniform Resource Identifier (URI) into the web browser. In this regard, the prefix of the URI may be utilized to determine how to interpret the URI. For example, a URI that starts with "http:" may identify a resource to be retrieved over Hypertext Transfer Protocol (HTTP). Other prefixes that may be supported include "https:" for HTTP Secure (HTTPS), "ftp:" for the File Transfer Protocol (FTP), and "file:" for local files, for example. A Uniform Resource Locator (URL) is typically a subset of the URI that specifies the location where an information resource is available for retrieval and/or the mechanism for retrieval.

Once the information resource has been retrieved, the web browser may be operable to display it. For example, HyperText Markup Language (HTML) may be passed to a layout engine in the web browser to be transformed from markup representation to an interactive document. In addition to HTML, web browsers may display different types of content on a web page. For example, web browsers may display images, audio, video, text, and/or Extensible Markup Language (XML) files, and often comprise and/or support certain plug-ins for, for example, Flash applications and/or Java applets. In one embodiment of the invention, in instances when a file of an unsupported type or a file that is set up to be downloaded rather than displayed is encountered, the browser may prompt the user to save the file to fixed and/or removable memory storage, for example, a memory in the set-top-box. In another embodiment of the invention, the web browser may present one or more requests to the local server 130 or to a server in the server computing cloud 150 to assist with handling at least a portion of the unsupported content.

The local server 130 may comprise suitable logic, circuitry, code, and/or interfaces that may be operable to run or execute certain software applications that may be accessible from the STB 120 via the broadband connection 140. In this regard, the local server 130 may be operable to provide support to the web browsing operations provided by the STB 120. The local server 130 may be implemented in a computing device, comprising for example a personal computer, laptop, tablet, or in a networking device, comprising for example, a router, which may provide processing capabilities that are sufficient for performing particular software applications. For example, in instances when the local server 130 is utilized to support web browsing operations in the STB 120, the processing capabilities in the local server 130 may be sufficient to run or execute software applications that provide such support.

The server computing cloud 150 may comprise a plurality of servers and/or computing devices associated with providing various services offered by the Internet. In this regard, the term 'cloud' typically refers to the Internet and is based on the graphical depiction of the Internet as a cloud in computer network diagrams to represent the underlying infrastructure of the Internet. The servers in the server computing cloud 150 may be utilized to provide reliable services that may be delivered through individual servers and/or data centers, for example. The server computing cloud 150 may appear, to a user or to a location (for example, location 105), as a single point of access to services and/or resources that may be provided by the server computing cloud 150. The servers in the server computing cloud 150 may comprise, for example, applications servers that may be dedicated to running certain software applications and/or web servers in which HTTP clients connect to send commands and receive responses along with data content.

A web server (not shown) in the server computing cloud 150, for example, may comprise suitable logic, circuitry, code, and/or interfaces that may be operable to deliver to a client (for example, the STB 120) web pages (for example, HTML documents) and associated content (for example, images, style sheets, JavaScripts). When a client requests a specific information resource using HTTP, the web server may respond by providing the content associated with that information resource. A full implementation of HTTP may enable the web server to receive content from a client.

A server 150a in the server computing cloud 150, such as an applications server, for example, may be utilized to support web browsing operations in the STB 120. In such instances, the server 150a in the server computing cloud 150 may have processing capabilities sufficient to run or execute software applications that provide such support. Whether the server 150a in the server computing cloud 150 or the local server 130 is utilized to support web browsing operations in the STB 120 may depend on the amount of latency that may be acceptable to a user when having web browsing operations in the STB 120. In this regard, a local resource (for example, the local server 130) may have lower latency than a remote resource (for example, the server 150a in server computing cloud 150). Whether the server 150a in the server computing cloud 150 or the local server 130 is utilized to support web browsing operations in the STB 120 may also depend on one or more connection parameters such as the processing capabilities, a type of network connection, connection speed, display parameters such as the display size and the display resolution of the television 110, the type of web content requested and the type of support that may be provided. The server 150a need not be physically collocated with a web server. The server 150a may be in different location from the web server.

The server computing cloud 150 may connect to the location 105 via a broadband connection 145. The broadband connection 145 may provide a wired connection between the server computing cloud 150 and the broadband connection 140 in the location 105 utilizing a coaxial cable, for example. Other embodiments, however, need not be so limited. For example, the broadband connection 145 may comprise a combination of wired and wireless portions, wherein the wired portion may utilize coaxial cables, optical fibers, and/or other large bandwidth transmission medium.

In operation, a user may decide to access a web page via a web browser in the STB 120 that is being displayed in the television 110 while sitting in his/her living room. The user may submit a URL to the web browser, which in turn sends a request for the information resource associated with that URL to a web server. The web server may pass the HTML and/or related content or information associated with the URL to the STB 120. The STB 120 may perform a pre-fetch operation of the web page information provided by the web server to determine the type of content, for example, audio, video, graphics, and/or text content that is comprised within the web page. The STB 120 may be operable to perform the pre-fetch operation as a background process, for example.

The server providing web browsing support to the STB 120, for example, the server 150a or 130 may be operable to receive a request to display one or more frames of web content from the one or more STBs 120. The server 150a or 130 may be operable to receive one or more parameters associated with the one or more frames of the requested web content from the one or more STBs 120. The server 150a or 130 may be operable to dynamically encode at least a portion of one or more frames of the requested web content into one or more color spaces based on the received one or more parameters. For example, in accordance with an embodiment of the invention, the server 150a may be operable to dynamically encode the video portion in a frame of the requested web content into a 4:2:0 color space and the graphics and/or text portion in the frame of the requested web content into a 4:2:2 color space.

In one exemplary embodiment of the invention, the processed content may be encoded with a low latency encoder protocol such as H.264/Advanced Audio Coding (ACC). In this regard, the server providing web browsing support to the STB 120 may be operable to transcode or provide direct conversion from one encoding format to another encoding format. In some embodiments of the invention, the transcoding may comprise changing the bitstream format of one file to another bitstream format without undergoing a decoding and re-encoding process.

The resulting audio and video (A/V) content produced at the server may then be streamed to the STB 120, which in turn decodes the A/V stream and renders the resulting information in the appropriate portion of the web page to composite the complete web page. The portions of the web page that are supported by the web browser in the STB 120 may be rendered before or concurrently with the information provided by the server. In other words, the data provided by the server may be sent to the STB 120 when needed to composite the complete page according to a predetermined approach or scheme. Once the user moves away from that particular web page, the server may terminate the jobs related to that web page.

In another embodiment of the invention, the STB 120 may be operable to have all web page content handled by the server providing web browsing support to the STB 120. In such embodiments, the server may receive the URL information associated with the web page from the STB 120 and may in turn request the contents of the web page from the web server. The server may then encode the information in a format that may be received by the STB 120 and may stream the A/V content to the STB 120 to composite the complete web page.

Although the STB 120 with a broadband connection capability is illustrated in FIG. 1 for full Internet experience, the invention may not be so limited. Accordingly, instead of the STB 120, the television 110 itself with a broadband connection capability for full Internet experience may be supported without departing from the spirit and scope of various embodiments of the invention.

Figure 2:
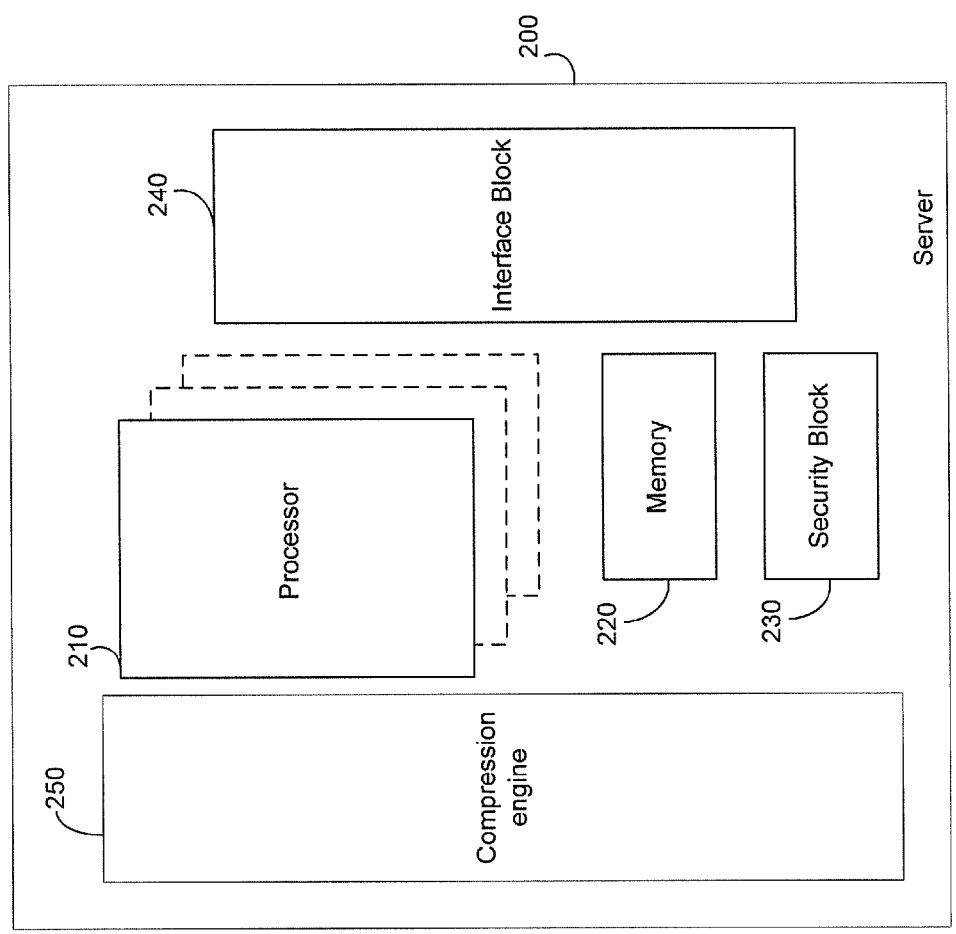
FIG. 2 is a block diagram that illustrates an exemplary server that supports web page rendering by a local web browser in an STB, in accordance with an embodiment of the invention.

FIG. 2 is a block diagram that illustrates an exemplary server that supports web page rendering by a local web browser in an STB, in accordance with an embodiment of the invention. Referring to FIG. 2, there is shown a server 200 that may comprise a processor 210, a memory 220, a security block 230, an interface block 240 and a compression engine 250.

In some embodiments, the server 200 may correspond to the local server 130 and may be operable to provide web browsing support to the STB 120 described above, for example. In other embodiments, the server 200 may correspond to a server in the server computing cloud 150 that may be operable to provide web browsing support to the STB 120.

The processor 210 may comprise suitable logic, circuitry, code, and/or interfaces that may be operable to process requests from the STB 120 to handle at least a portion of the content of a web page for subsequent rendering by the STB 120. In this regard, the processor 210 may be operable to convert and/or transcode content from one format into another format. For example, the processor 210 may be operable to process plug-ins unsupported by the web browser in the STB 120 and may encode such processed plug-ins with a low latency H.264/ACC encoder. The processor 210 may comprise a plurality of different encoders that may be utilized to encode different types of contents from a web page into different formats, for example.

The server 200 may comprise a plurality of processors 210, as indicated by the dashed outlines illustrated in FIG. 2. A single server 200 may be operable to support a plurality of STBs 120. In such instances, the server 200 may be operable to provide load balance and/or load sharing capabilities.

The compression engine 250 may comprise suitable logic, circuitry, code, and/or interfaces that may be operable to receive a request to display one or more frames of web content from the STB 120. The compression engine 250 may be operable to receive one or more parameters associated with the one or more frames of the requested web content from the STB 120. The received one or more parameters may comprise one or more of a type of requested web content, connection parameters, and/or display parameters. For example, the type of requested web content may comprise one or more of video content, audio content, graphics content and/or text content. The connection parameters may comprise one or both of a connection speed and/or a type of network connection, for example. The display parameters may comprise one or both of a display size and/or display resolution, for example.

The compression engine 250 may be operable to dynamically encode at least a portion, for example, a video portion of one or more frames of the requested web content into one or more color spaces, for example, 4:2:0, 4:2:2, or 4:4:4 based on the received one or more parameters. For example, in accordance with an embodiment of the invention, the compression engine 250 may be operable to dynamically encode the audio portion in a frame of the requested web content into a 4:2:0 color space and the graphics portion in the frame of the requested web content into a 4:2:2 color space.

The compression engine 250 may be operable to dynamically modify a frame rate for encoding at least a portion, for example, a video portion of the one or more frames of the requested web content based on the received one or more parameters. For example, in accordance with an embodiment of the invention, the compression engine 250 may be operable to dynamically encode a video portion of a frame of the requested web content at 60 frames per second and dynamically encode a graphics portion of a frame of the requested web content at 10 frames per second. Notwithstanding, the invention may not be so limited, and other frame rates may be utilized for handling different portions of a frame without limiting the scope of the invention. The compression engine 250 may be operable to communicate the dynamically encoded portion, for example, a video portion of one or more frames of the requested web content to the STB 120.

The memory 220 may comprise suitable logic, circuitry, code, and/or interfaces that may be operable to store information associated with the operation of the processor 210. The memory 220 may be operable to store information (for example, coefficients, tables) associated with the encoding operations supported by the processor 210.

The security block 230 may comprise suitable logic, circuitry, code, and/or interfaces that may be operable to support authentication operations, certificate usage, and/or cryptographic operations that may be utilized to provide secure connections between the server and the STB 120, for example.

The interface block 240 may comprise suitable logic, circuitry, code, and/or interfaces that may be operable to enable the server 200 to communicate with the STB 120 and/or with a web server from which to obtain web page information, for example. The interface block 240 may support a plurality of physical and/or logical connections or interfaces. When the server 200 corresponds to the local server 130 described above, the interface block 240 may support communication with the STB 120 via the broadband connection 140 (for example, coaxial cable).

In operation, the server 200 may receive a request to display one or more frames of web content from the STB 120 and may receive one or more parameters associated with the requested frames. The server 200 may dynamically encode at least a portion of the requested one or more frames into one or more color spaces, and modify the frame rate for encoding the requested frames based on the received parameters from the STB 120. The resulting NV content produced at the server 200 may then be streamed to the STB 120, which in turn decodes the A/V stream and composites the complete web page.

In some embodiments of the invention, when the content that may need to be processed in the server 200 is secure content, the server 200 and the STB 120 may need to perform a two-way authentication operation before establishing a secure link between them and having the STB 120 share credentials with the server 200.

Figure 3:
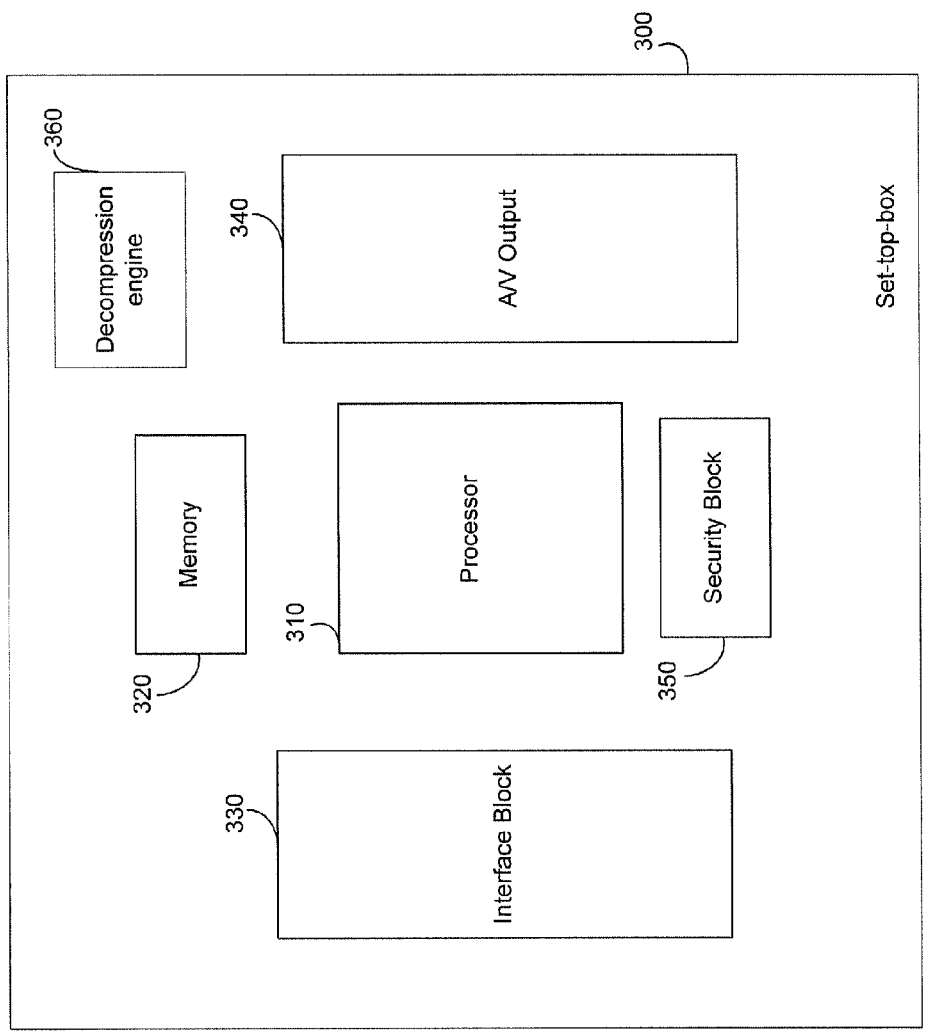
FIG. 3 is a block diagram that illustrates an exemplary STB that enables a user of the STB to access Internet services, in accordance with an embodiment of the invention.

FIG. 3 is a block diagram that illustrates an exemplary STB that enables a user of the STB to access Internet services, in accordance with an embodiment of the invention. Referring to FIG. 3, there is shown an STB 300 that may comprise a processor 310, a memory 320, a security block 350, an interface block 330, an A/V output 340, and a decompression engine 360. In some embodiments, two or more of the components of the STB 300 may be integrated into a single chip.

The processor 310 may comprise suitable logic, circuitry, code, and/or interfaces that may be operable to provide processing associated with managing, delivering, and/or storing video content that may be displayed on, for example, the television 110 described above. The processor 310 may also be operable to run or execute a web browser that may be displayed on the screen of the television 110 for user interaction.

The processor 310 may be operable to perform a pre-fetch operation of web page information provided by a web server to determine the type of content that is comprised within the web page. The processor 310 may be operable to perform the pre-fetch operation as a background process, for example.

The processor 310 may be operable to make one or more requests for handling either certain portions of a web page or the entire web page to a server that is operable to provide web browsing support to the STB 300. The processor 310 may be operable to receive an A/V stream from such server and composite a complete web page on the web browser.

The memory 320 may comprise suitable logic, circuitry, code, and/or interface that may be operable to store information associated with the operation of the processor 310.

The security block 350 may comprise suitable logic, circuitry, code, and/or interfaces that may be operable to support authentication operations, certificate usage, and/or cryptographic operations that may be utilized to provide a secure connection between a server, which may be operable to provide web browsing support to the STB 300, and the STB 300, for example.

The interface block 330 may comprise suitable logic, circuitry, code, and/or interfaces that may enable the STB 330 to interface with a plurality of devices, including application servers and/or web servers. For example, the interface block 330 may support connections with cable TV services and/or satellite services. The interface block 330 may support multiple ports such as High-Definition Multimedia Interface (HDMI), Ethernet Physical Layer (PHY), Universal Serial Bus (USB), and RS232, for example. Other types of connections, protocols, and/or ports may also be supported.

The decompression engine 360 may comprise suitable logic, circuitry, code, and/or interfaces that may be operable to communicate a request to display one or more frames of web content to the server 200. The decompression engine 360 may be operable to communicate one or more parameters associated with the one or more frames of the requested web content to the server 200. The received one or more parameters may comprise one or more of a type of requested web content, connection parameters, and/or display parameters.

The decompression engine 360 may be operable to receive the dynamically encoded portion, for example, a video portion of one or more frames of the requested web content from the server 200. The decompression engine 360 may be operable to dynamically decode the received dynamically encoded portion, for example, a video portion of one or more frames of the requested web content. The video decompression engine 360 may be operable to dynamically modify a frame rate for decoding the dynamically encoded portion, for example, a video portion of one or more frames of the requested web content.

The A/V output 340 may comprise suitable logic, circuitry, code, and/or interfaces that may be operable to provide audio and/or video content for display or reproduction to, for example, the television 110 described above. In this regard, the A/V output 340 may support multiple technical standards such as DTV and HDTV, and/or multiple screen resolutions.

Although an STB with a broadband connection capability is illustrated in FIG. 3 for full Internet experience, the invention may not be so limited. Accordingly, other devices such as a television itself with a broadband connection capability for full Internet experience may be supported without departing from the spirit and scope of various embodiments of the invention.

In operation, a web browser may be run in the STB 300 and may be displayed in a television, for example television 110, via the A/V output 340. When a user interacts with the web browser, for example via a set-top-box remote control or keyboard, and submits a URL to the web browser, the STB 300 may send a request for the information resource associated with that URL to a web server via the interface block 330. The web server may pass the HTML and/or related content or information associated with the URL to the STB 300 via the interface block 330. The processor 310 may perform a pre-fetch operation of the web page information provided by the web server to determine the type of content that is comprised within the web page.

The processor 310 may send one or more requests to a server that is operable to provide web browsing support to the STB 300 via the interface block 330. The request may comprise information regarding the URL of the web page. In response, the server may send an A/V stream to the STB 300. The processor 310 in the STB 300 may decode the A/V stream and may render the resulting information to composite the complete web page.

Figure 4:
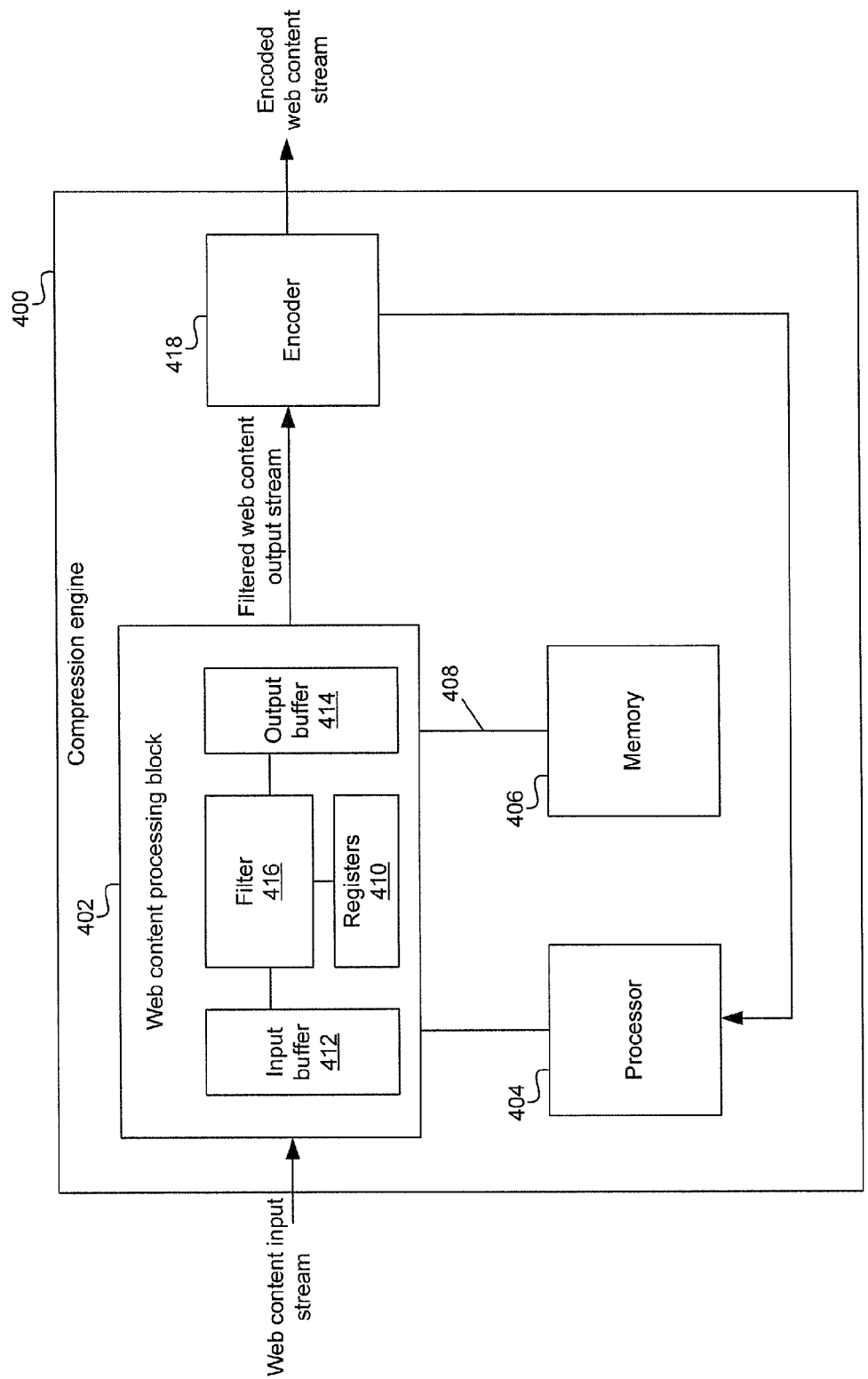
FIG. 4 is a block diagram of an exemplary compression engine in an exemplary server that supports web page rendering by a local web browser in an STB, in accordance with an embodiment of the invention.

FIG. 4 is a block diagram of an exemplary compression engine in an exemplary server that supports web page rendering by a local web browser in an STB, in accordance with an embodiment of the invention. Referring to FIG. 4, there is shown a web content processing block 402, a processor 404, a memory 406, an encoder 418 and a data/control bus 408. The web content processing block 402 may comprise registers 410 and filter 416. In some instances, the web content processing block 402 may also comprise an input buffer 412 and/or an output buffer 414.

The web content processing block 402 may comprise suitable logic, circuitry, interfaces and/or code that may be operable to filter pixels in a picture or a video picture from a video input stream to reduce noise. For example, video frame pictures may be utilized in video systems with progressive video signals while video field pictures may be utilized in video systems with interlaced video signals. Video fields may alternate parity between top fields and bottom fields. A top field and a bottom field in an interlaced system may be deinterlaced or combined to produce a video frame.

The web content processing block 402 may be operable to receive a web content input stream and, in some instances, to buffer at least a portion of the received web content input stream in the input buffer 412. In this regard, the input buffer 412 may comprise suitable logic, circuitry, interfaces, and/or code that may be operable to store at least a portion of the received web content input stream. Similarly, the web content processing block 402 may be operable to generate a filtered web content output stream to a decoder and, in some instances, to buffer at least a portion of the generated filtered web content output stream in the output buffer 414. In this regard, the output buffer 414 may comprise suitable logic, circuitry, interfaces, and/or code that may be operable to store at least a portion of the filtered web content output stream.

The filter 416 in the web content processing block 402 may comprise suitable logic, circuitry, interfaces, and/or code that may be operable to perform filtering operation with noise reduction on the current pixel. In this regard, the filter 416 may operate in a plurality of filtering modes, where each filtering mode may be associated with one of a plurality of supported filtering operations. The filter 416 may utilize web content, filter coefficients, threshold levels, and/or constants to generate the filtered web content output stream in accordance with the filtering mode selected. In this regard, the web content processing block 402 may generate blending factors to be utilized with the appropriate filtering mode selected. The registers 410 in the web content processing block 402 may comprise suitable logic, circuitry, interfaces, and/or code that may be operable to store information that corresponds to filter coefficients, threshold levels, and/or constants, for example. Moreover, the registers 410 may be operable to store information that corresponds to a selected filtering mode.

The processor 404 may comprise suitable logic, circuitry, interfaces, and/or code that may be operable to process data and/or perform system control operations. The processor 404 may be operable to control at least a portion of the operations of the web content processing block 402. For example, the processor 404 may generate at least one signal to control the selection of the filtering mode in the web content processing block 402. Moreover, the processor 404 may be operable to program, update, and/or modify filter coefficients, threshold levels, and/or constants in at least a portion of the registers 410. For example, the processor 404 may generate at least one signal to retrieve stored filter coefficients, threshold levels, and/or constants that may be stored in the memory 406 and transfer the retrieved information to the registers 410 via the data/control bus 408.

The memory 406 may comprise suitable logic, circuitry, interfaces, and/or code that may be operable to store information that may be utilized by the web content processing block 402 to reduce noise in the web content input stream. The memory 406 may be operable to store filter coefficients, threshold levels, and/or constants, for example, to be utilized by the web content processing block 402.

The encoder 418 may comprise suitable logic, circuitry, interfaces, and/or code that may be operable to receive and process a plurality of statistical inputs from the processor 404 and the web content processing block 402. The encoder 418 may be operable to dynamically encode the received web content into one or more color spaces based on the type of web content, for example. The encoder 418 may be operable to generate the encoded web content stream based on encoding the filtered web content output stream.

In operation, the processor 404 may select a filtering mode of operation and may program the selected filtering mode into the registers 410 in the web content processing block 402. Moreover, the processor 404 may program the appropriate values for the filter coefficients, threshold levels, and/or constants into the registers 410 in accordance with the selected filtering mode. The web content processing block 402 may receive the request for the web content input stream and may dynamically encode pixels in a portion of the frames of requested web content into one or more color spaces. In some instances, the web content input stream may be stored in the input buffer 412 before processing. The web content processing block 402 may generate the appropriate blending factors needed to perform the noise reduction filtering operation selected by the processor 404. The web content processing block 402 may generate the filtered web content output stream after performing the noise reduction filtering operation. In some instances, the filtered web content output stream may be stored in the output buffer 414 before being transferred out of the web content processing block 402. The processor 404 may be operable to dynamically modify a frame rate for encoding the requested web content based on the type of requested web content.

The processor 404 may determine the mode of operation of various portions of the web content processing block 402. For example, the processor 404 may configure data registers in the web content processing block 402 to allow direct memory access (DMA) transfers of video data to the memory 406. The processor 404 may also communicate instructions to an image sensor to initiate capturing of images. The memory 406 may be used to store image data that may be processed and communicated by the processor 404. The memory 406 may also be used for storing code and/or data that may be used by the processor 404. The memory 406 may also be used to store data for other functionalities of the web content processing block 402. For example, the memory 406 may store data corresponding to audio communication. The processor 404 may comprise a state machine that may enable determination of whether video data type is interlaced type or progressive type.

Figure 5:
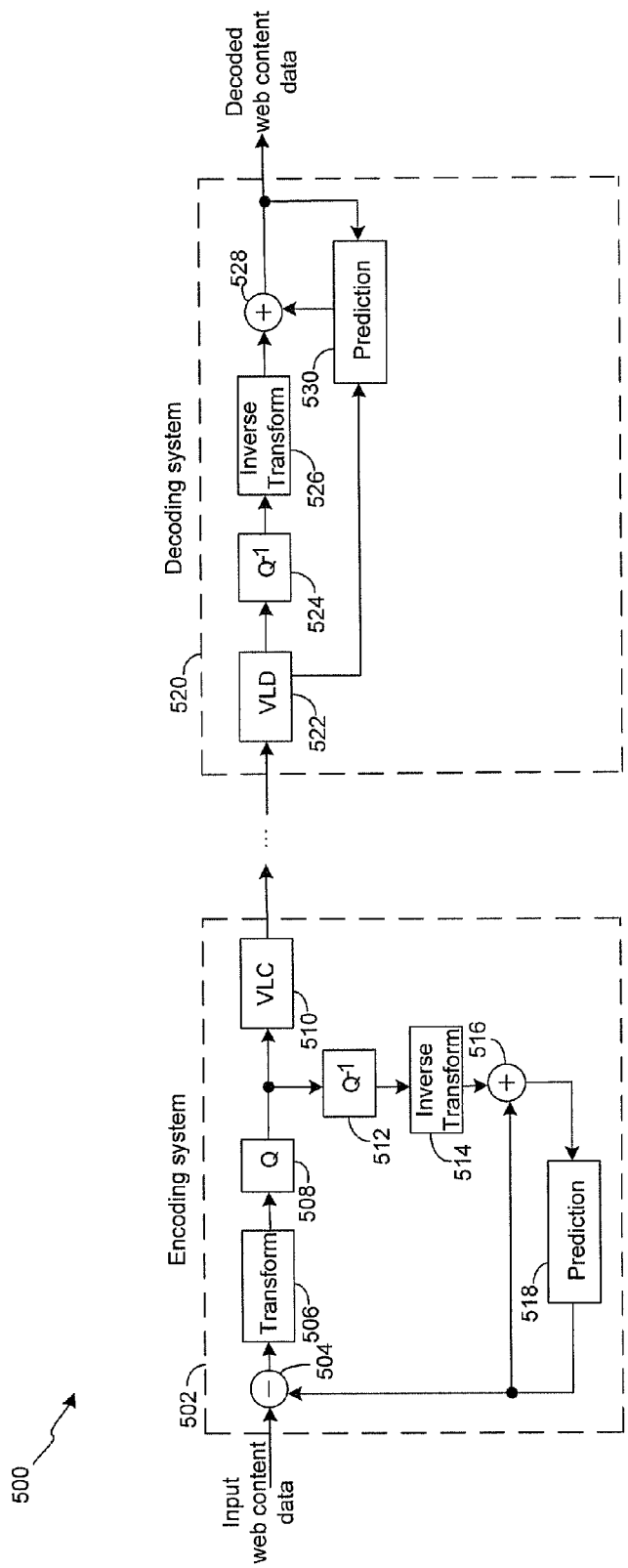
FIG. 5 is a block diagram of an exemplary encoding and decoding system for handling web content, in accordance with an embodiment of the invention.

FIG. 5 is a block diagram of an exemplary encoding and decoding system for handling web content, in accordance with an embodiment of the invention. Referring to FIG. 5, there is shown a web content processing system 500. The web content processing system 500 may comprise a web content encoding system 502 and a web content decoding system 520. The web content encoding system 502 and the web content decoding system 504 may be associated with a particular video standard, for example, MPEG-2, H.264/MPEG-4 AVC, VC1 and VP6 for handling video content.

The web content encoding system 502 may comprise a subtractor 504, a transform block 506, a quantizer 508, a variable length entropy encoder (VLC) 510, an inverse quantizer 512, an inverse transform block 514, a summer 516 and a prediction block 518. The web content encoding system 502 may be located in a server, for example, server 150a or server 130.

The web content decoding system 520 may comprise a variable length entropy decoder (VLD) 522, an inverse quantizer 524, an inverse transform block 526, a summer 528 and a prediction block 530. The web content decoding system 520 may be located in a set-top box, for example, STB 120.

The web content encoding system 502 may be enabled to receive web content data. The transform block 506 may comprise suitable logic, circuitry, interfaces, and/or code that may be operable to perform a transform, for example, DCT transform of the received web content data. The transform block 506 may generate DCT coefficients, which may be communicated to the quantizer 508. The quantizer 508 may comprise suitable logic, circuitry, interfaces, and/or code that may be operable to generate quantized coefficients. The VLC 510 may comprise suitable logic, circuitry, interfaces, and/or code that may be operable to encode and scan the generated quantized coefficients using zig-zag or alternate scan, and dynamically encode portions of the frames of requested web content into one or more color spaces and communicate the encoded video data to the web content decoding system 520.

The inverse quantizer 512 may comprise suitable logic, circuitry, interfaces, and/or code that may be operable to process the generated quantized coefficients from the quantizer 508 in order to generate quantized residue data. The inverse transform block 512 may be operable to generate reconstructed residual pictures to the summer 516 for processing subsequent web content data such as video pictures.

An encoding method, for example, MPEG-2, H.264/MPEG-4 AVC, VC1 and VP6 may be utilized to generate one or more motion vectors. The motion vectors may be communicated to the prediction block 518, which may use the motion vectors to generate a motion compensated block of pictures from the reconstructed pictures. The subtractor 504 may be operable to subtract the motion compensated block pictures from the original pictures, and the resultant residual pictures may be processed by the transform block 506.

The web content encoding system 502 may be operable to encode the received web content data and communicate the encoded data to the web content decoding system 520. The web content decoding system 520 may be operable to receive the encoded web content data from the web content encoding system 502.

The VLD 522 may comprise suitable logic, circuitry, interfaces, and/or code that may be operable to receive an encoded web content stream from a web content encoder, for example, the VLC 510. The VLD 522 may be operable to decode the received encoded web content stream and generate block motion vectors based on decoding the received encoded web content stream.

The inverse quantizer 524 may comprise suitable logic, circuitry, interfaces, and/or code that may be operable to generate quantized residue data. The inverse transform block 524 may be operable to generate reconstructed residual pictures to the summer 528.

The prediction block 530 may comprise suitable logic, circuitry, interfaces, and/or code that may be operable to receive one or more motion vectors from the VLD 522 in order to generate a motion compensated block of pictures. The summer 528 may be operable to add the motion compensated block of pictures to the reconstructed residual pictures to generate one or more decoded pictures. One or more decoded pictures may be fed back to the prediction block 530. The prediction block 530 may be operable to generate a motion compensated block of pictures from a reference image or a previous output picture based on receiving one or more motion vectors from the VLD 522. The VLD 522 may be operable to dynamically decode the received encoded web content data.

Figure 6:
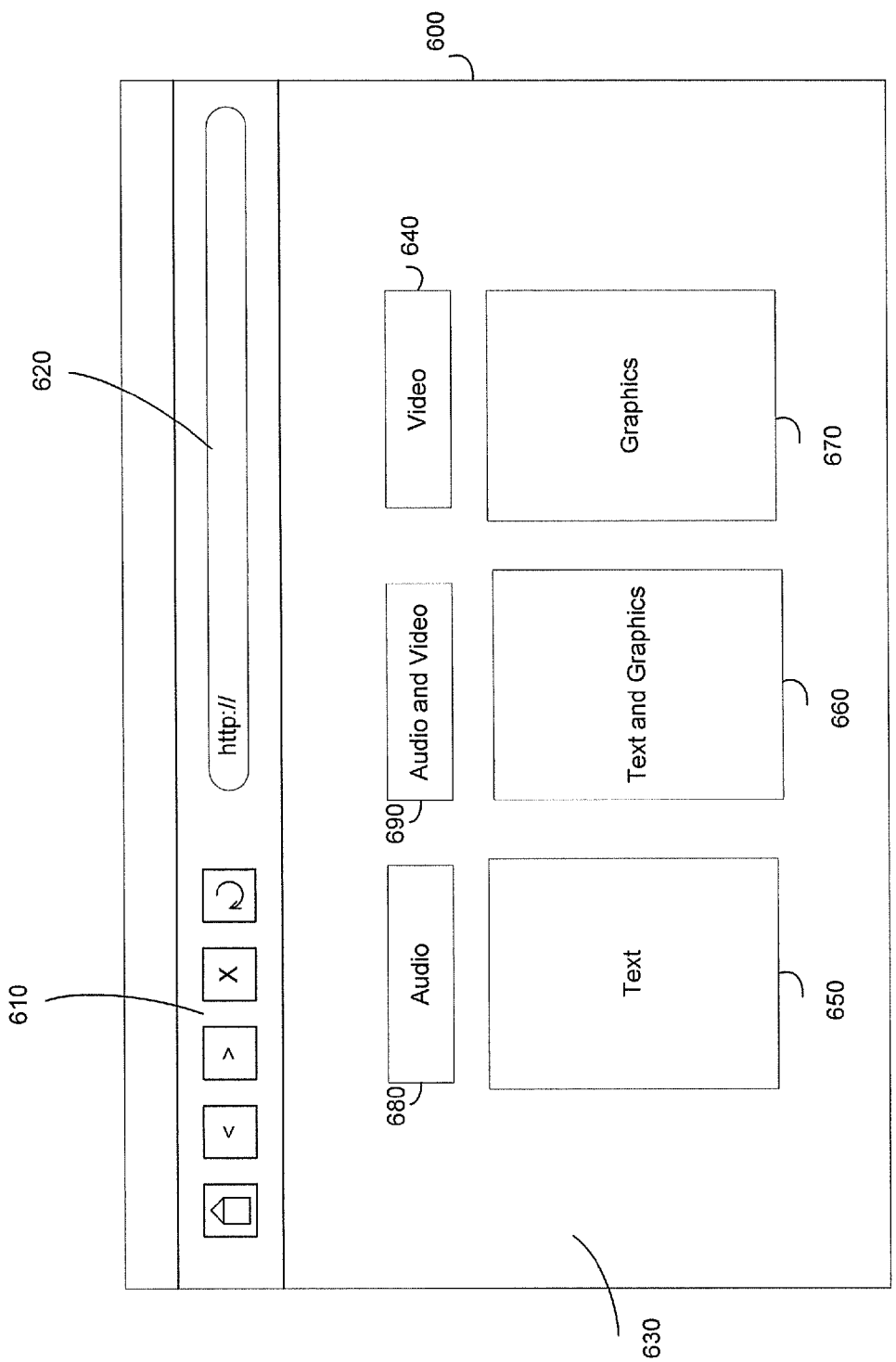
FIG. 6 is a diagram that illustrates an exemplary web page with multiple content types that is to be displayed by a local web browser in an STB, in accordance with an embodiment of the invention.

FIG. 6 is a diagram that illustrates an exemplary web page with multiple content types that is to be displayed by a local web browser in an STB, in accordance with an embodiment of the invention. Referring to FIG. 6, there is shown a web browser 600 in which a frame 630 is to be displayed or rendered. The web browser 600 may comprise certain user interface elements 610 (for example, back, forward, reload, stop, home) that may be utilized for navigation and/or operation, and an address bar 620 that may be utilized to submit a URI.

The frame 630 to be displayed in the web browser 600 may comprise different types of web contents. In the example illustrated in FIG. 6, the frame 630 may comprise a video portion 640, a text portion 650, a text and graphics portion 660, a graphics portion 670, an audio portion 680, an audio and video portion 690.

In operation, a web browser may be run in the STB 300 and may be displayed in a television, for example television 110, via the A/V output 340. When a user interacts with the web browser 600, for example via a set-top-box remote control or keyboard, and submits a URL to the web browser 600 via the address bar 620, the STB 300 may send a request for the information resource associated with that URL to a web server via the interface block 330. The web server may pass the HTML and/or related content or information associated with the URL to the STB 300 via the interface block 330. The STB 300 may perform a pre-fetch operation of the web page information provided by the web server to determine the type of content that is comprised within the frame 630.

The STB 300 may send one or more requests and one or more parameters associated with the requests to a server 200 that is operable to provide web browsing support to the STB 300. The request may comprise information regarding the URL of the web page. In response, the server 200 may dynamically encode at least a portion, for example, a text portion 650 of frame 630 of the requested web content into a 4:2:2 color space, a graphics portion 670 of frame 630 into a 4:2:2 color space, a text and graphics portion 660 of frame 630 into a 4:2:2 color space, a video portion 640 of frame 630 into a 4:2:0 color space, an audio portion 680 of frame 630 into a 4:2:2 color space, and an audio and video portion 690 of frame 630 into a 4:4:4 color space based on the received one or more parameters. Notwithstanding, the invention may not be so limited, and other portions of frame 630 may be dynamically encoded into other color spaces without limiting the scope of the invention.

Figure 7:
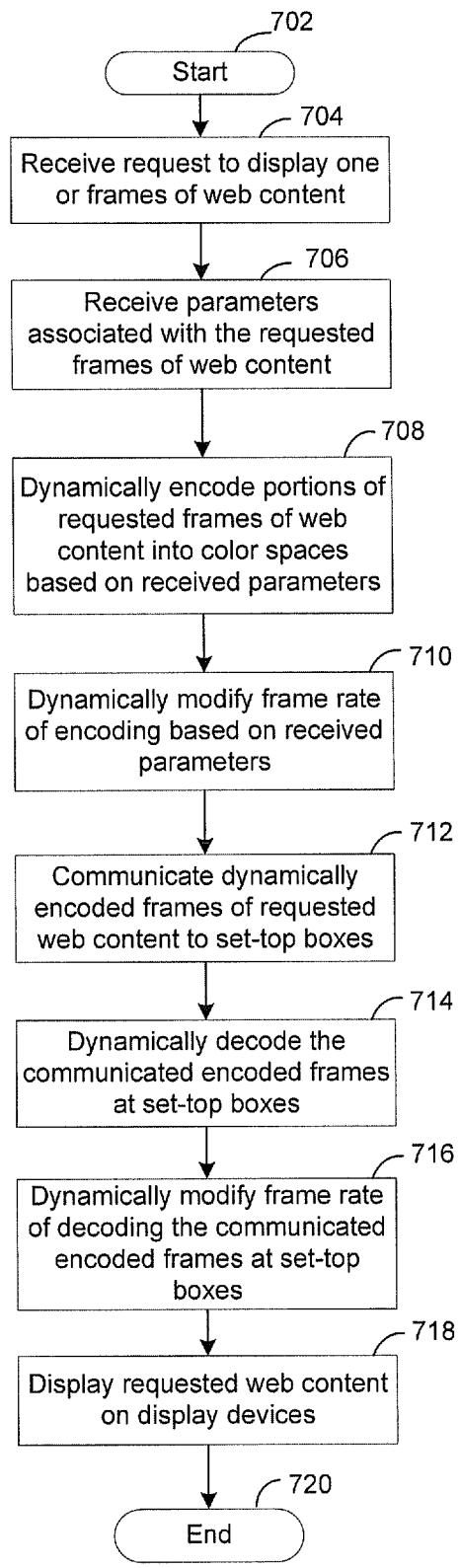
FIG. 7 is a flowchart illustrating exemplary steps for compression and decompression for handling web content, in accordance with an embodiment of the invention.

FIG. 7 is a flowchart illustrating exemplary steps for compression and decompression for handling web content, in accordance with an embodiment of the invention. Referring to FIG. 7, exemplary steps may begin at step 702. In step 704, the compression engine 250 may be operable to receive a request to display one or more frames of web content from the STB 120. In step 706, the compression engine 250 may be operable to receive one or more parameters associated with the one or more frames from the STB 120. In step 708, the compression engine 250 may be operable to dynamically encode at least a portion of one or more frames of the requested web content into one or more color spaces based on the received one or more parameters.

In step 710, the compression engine 250 may be operable to dynamically modify a frame rate for encoding at least a portion of the one or more frames based on the received one or more parameters. In step 712, the compression engine 250 may be operable to communicate the dynamically encoded portion of one or more frames to the STB 120. In step 714, the video decompression engine 360 may be operable to dynamically decode the communicated dynamically encoded portion of one or more frames. In step 716, the video decompression engine 360 may be operable to dynamically modify a frame rate for decoding the dynamically encoded portion of one or more frames. In step 718, the STB 120 may be operable to display the requested web content on one or more display devices. Control then passes to end step 720.

In accordance with an embodiment of the invention, a method and system for compression and decompression for handling web content may comprise a communication system 100 (FIG. 1) that comprises a server 150a (FIG. 1) that coordinates operation of one or more set-top boxes 120 (FIG. 1). One or more processors and/or circuits in the server 150a, for example, the compression engine 250 (FIG. 2) may be operable to receive a request to display one or more frames, for example, frame 630 (FIG. 6) of web content from the one or more set-top boxes 120. One or more processors and/or circuits in the server 150a, for example, the compression engine 250 may be operable to receive one or more parameters associated with the one or more frames, for example, frame 630 of the requested web content from the one or more set-top boxes 120. One or more processors and/or circuits in the server 150a, for example, the compression engine 250 may be operable to dynamically encode at least a portion, for example, a video portion 640 (FIG. 6) of one or more frames, for example, frame 630 of the requested web content into one or more color spaces based on the received one or more parameters. For example, in accordance with an embodiment of the invention, the compression engine 250 may be operable to dynamically encode the video portion 640 in the frame 630 of the requested web content into a 4:2:0 color space and the graphics portion 670 in the frame 630 of the requested web content into a 4:2:2 color space.

The received one or more parameters may comprise one or more of a type of requested web content, connection parameters, and/or display parameters. For example, the type of requested web content may comprise one or more of video content, audio content, graphics content and/or text content. The connection parameters may comprise one or both of a connection speed and/or a type of network connection, for example. The display parameters may comprise one or both of a display size and/or display resolution, for example. The one or more processors and/or circuits in the server 150a, for example, the compression engine 250 may be operable to dynamically modify a frame rate for encoding at least a portion, for example, a video portion 640 of the one or more frames, for example, frame 630 of the requested web content based on the received one or more parameters.

One or more processors and/or circuits in the server 150a, for example, the compression engine 250 may be operable to communicate the dynamically encoded portion, for example, a video portion 640 of one or more frames, for example, frame 630 of the requested web content to the one or more set-top boxes 120. One or more processors and/or circuits in the one or more set-top boxes 120, for example, the video decompression engine 360 may be operable to dynamically decode the communicated dynamically encoded portion, for example, a video portion 640 of one or more frames, for example, frame 630 of the requested web content. One or more processors and/or circuits in the one or more set-top boxes 120, for example, the video decompression engine 360 may be operable to dynamically modify a frame rate for decoding the dynamically encoded portion, for example, a video portion 640 of one or more frames, for example, frame 630 of the requested web content. The server may be located in a server computing cloud 150 (FIG. 1) or is a local server 130 (FIG. 1), for example.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for compression and decompression for handling web content.

Accordingly, the present invention may be realized in hardware or a combination of hardware and software. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling web content, the method comprising:

in a communication system comprising a server that coordinates operation of one or more set-top boxes:

receiving at said server, a request to display one or more frames of web content from said one or more set-top boxes;

receiving at said server, from said one or more set-top boxes, one or more parameters associated with said one or more frames of said requested web content, said one or more parameters including a connection parameter indicative of a type or characteristic of a connection between said server and said one or more set-top boxes;

receiving, by said server, said one or more frames of web content from a web server on behalf of said one or more set-top boxes;

dynamically encoding, by said server, using said connection parameter received from said one or more set-top boxes, a first portion of said one or more frames of said requested web content into a first color space responsive to determining that said first portion comprises a video content, and a second portion of said one or more frames into a second color space responsive to determining that said second portion comprises one or both of: a graphics content and/or a text content; and communicating, by said server to said one or more set-top boxes, said first portion encoded in the first color space and said second portion encoded in the second color space, wherein said one or more set-top boxes are configured to decode said encoded first and second portions, and composite said decoded first and second portions of said one or more frames of said requested web content for presentation.

2. The method according to claim 1, wherein said one or more parameters further comprises one or more of: a type of said requested web content and/or display parameters.

3. The method according to claim 1, wherein said requested web content comprises one or more of: video content, audio content, graphics content and/or text content.

4. The method according to claim 1, wherein said connection parameter corresponds to a connection speed and/or latency.

5. The method according to claim 2, wherein said display parameters comprises one or both of: a display size and/or a display resolution.

6. The method according to claim 1, comprising dynamically modifying a frame rate for encoding at least one of said first portion or said second portion of said one or more frames of said requested web content based on said received one or more parameters.

7. The method according to claim 1, comprising facilitating, by said server, transmission of said first and second portions of said one or more frames of said requested web content to said one or more set-top boxes by encoding said first portion into said first color space and said second portion into said second color space for transmission to said one or more set-top boxes.

8. The method according to claim 1, wherein said one or more set-top boxes is configured to dynamically decode said communicated said dynamically encoded first and second portions of said one or more frames of said requested web content.

9. The method according to claim 1, wherein said one or more set-top boxes is configured to dynamically modify a frame rate for decoding at least one of said dynamically encoded first and second portions of said one or more frames of said requested web content.

10. The method according to claim 1, wherein said server is utilized to support web browsing operations in said one or more set-top boxes, said server configured to obtain said one or more frames of web content from said web server responsive to the request from said one or more set-top boxes.

11. A system for handling web content, the system comprising:
in a communication system comprising a server in a server computing cloud that coordinates operation of one or more set-top boxes, one or more processors and/or circuits for use in said server, wherein said one or more processors and/or circuits are configured to:
receive at said server, a request to display one or more frames of web content from said one or more set-top boxes;
receive at said server, from said one or more set-top boxes, one or more parameters associated with said one or more frames of said requested web content, said one or more parameters including a connection parameter indicative of a type or characteristic of a connection between said server and said one or more set-top boxes;
receive, by said server, said one or more frames of web content from a web server on behalf of said one or more set-top boxes;
dynamically encode, by said server, using said connection parameter received from said one or more set-top boxes, a first portion of said one or more frames of said requested web content into a first color space responsive to determining that said first portion comprises a video content, and a second portion of said one or more frames into a second color space responsive to determining that said second portion comprises one or both of: a graphics content and/or a text content; and
communicate, by said server to said one or more set-top boxes, said first portion encoded in the first color space and said second portion encoded in the second color space, wherein said one or more set-top boxes are configured to decode said encoded first and second portions, and composite said decoded first and second portions of said one or more frames of said requested web content for presentation.

12. The system according to claim 11, wherein said one or more parameters further comprises one or more of: said type of said requested web content and/or display parameters.

13. The system according to claim 11, wherein said requested web content comprises one or more of: video content, audio content, graphics content and/or text content.

14. The system according to claim 11, wherein said connection parameter corresponds to a connection speed and/or latency.

15. The system according to claim 12, wherein said display parameters comprises one or both of: a display size and/or a display resolution.

16. The system according to claim 11, wherein said one or more processors and/or circuits are configured to dynamically modify a frame rate for encoding at least one of said first portion or said second portion of said one or more frames of said requested web content based on said received one or more parameters.

17. The system according to claim 11, wherein said one or more processors and/or circuits are configured to facilitate transmission of said first and second portions of said one or more frames of said requested web content to said one or more set-top boxes by encoding said first portion into said first color space and said second portion into said second color space for transmission to said one or more set-top boxes.

18. The system according to claim 11, wherein one or more processors and/or circuits in said one or more set-top boxes is configured to dynamically decode said communicated said dynamically encoded first and second portions of said one or more frames of said requested web content.

19. The system according to claim 11, wherein one or more processors and/or circuits in said one or more set-top boxes is configured to dynamically modify a frame rate for decoding at least one of said dynamically encoded first and second portions of said one or more frames of said requested web content.

20. The system according to claim 11, wherein said server is utilized to support web browsing operations in said one or more set-top boxes, said server configured to obtain said one or more frames of web content from said web server responsive to the request from said one or more set-top boxes.

21. A method implemented in a communication system for handling web content, comprising:
receiving, by a server, a request to display one or more frames of web content from one or more set-top boxes;
receiving, by said server, from said one or more set-top boxes, one or more parameters associated with the one or more frames of the requested web content, said one or more parameters including a connection parameter indicative of a type or characteristic of a connection between said server and said one or more set-top boxes;
receiving, by said server, said one or more frames of web content from a web server on behalf of said one or more set-top boxes;
dynamically encoding, by said server using said connection parameter, a first portion of the one or more frames of the requested web content into a first color space responsive to the first portion comprising a first content type, and a second portion of the one or more frames into a second color space responsive to the second portion comprising a second content type; and
communicating, by said server to said one or more set-top boxes, said first portion encoded in the first color space and said second portion encoded in the second color space, wherein said one or more set-top boxes are configured to decode said encoded first and second portions, and composite said decoded first and second portions of said one or more frames of said requested web content for presentation.

* * * * *